Jan. 13, 1970  J. A. FEHR, JR  3,489,846
BUSWAY JOINT COVER WITH EXPANSION ACCOMMODATING MEANS
Filed Sept. 29, 1967  2 Sheets-Sheet 1
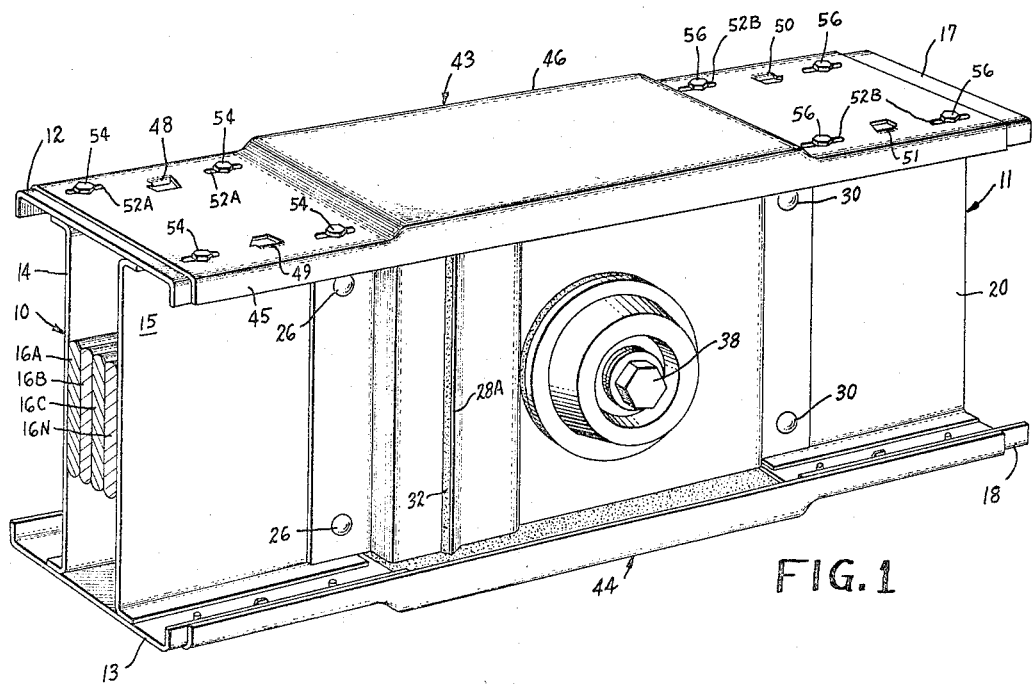
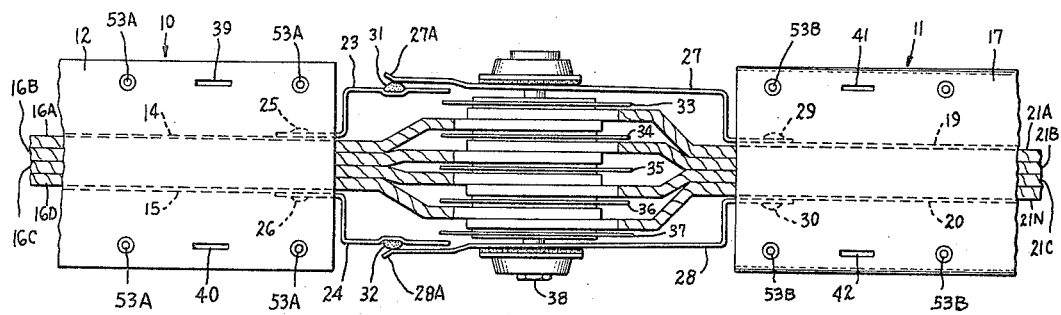
INVENTOR
JOSEPH A. FEHR, JR.
BY Arthur E. Fournier Jr
ATTORNEY

INVENTOR
JOSEPH A. FEHR, JR.

ATTORNEY

United States Patent Office 3,489,846
Patented Jan. 13, 1970

3,489,846
BUSWAY JOINT COVER WITH EXPANSION
ACCOMMODATING MEANS
Joseph A. Fehr, Jr., Simsbury, Conn., assignor to General
Electric Company, a corporation of New York
Filed Sept. 29, 1967, Ser. No. 671,662
Int. Cl. H02g 5/06
U.S. Cl. 174—88                                                2 Claims

ABSTRACT OF THE DISCLOSURE

A busway joint cover having holes and tabs at each end joining two adjacent sections of busway housing, having corresponding holes therein; the tabs of the joint cover being inserted in corresponding holes in the busway housings and thereby aligning the respective bolt-receiving holes, bolts being utilized to hold the members together; the tabs being notched and the bolt holes in the joint cover being elongated in order to allow the busway housings and the busbars supported therein to shift longitudinally as required due to the thermal expansion thereof which occurs under operating conditions.

BACKGROUND OF THE INVENTION

Field of the invention

My invention relates to electric power busways of the type including an elongated metallic housing or duct and a plurality of rigid busbar conductors supported therein, and particularly to means for connecting the ends of adjacent sections of such busway housings together while still permitting thermal expansion of the metallic housings and the busbar conductors to occur.

Description of the prior art

Under normal operating conditions, the individual busbars as well as the busway housing of an electric power busway are subject to thermal expansion caused by the heat generated as a result of the passage of electric current through the busbars. The exact amount of expansion which occurs is of course a function of the material of which the part is formed. Thus, for example, aluminum busbars are subject to more thermal expansion per given length than are copper busbars, while the busway housing which is generally made of steel will expand in a still differing amount.

Normally in short runs of busway, the effect of thermal expansion even when the cumulative amounts thereof are considered is not significant enough to cause any problems. Thermal expansion, however, can become a problem in long runs of busway as well as in those installations wherein both ends of the busway are fixed, the busway being mounted either horizontally or vertically, and in multistory applications wherein the busway rises vertically between floors. The forces created as a result of thermal expansion have been for example strong enough in those installations wherein both ends of the busway are fixed to cause the individual busbars to bow outwardly resulting in failures due to breakdowns in insulation, etc. With vertically mounted busway systems wherein the busway housing is supported at each individual floor as it passes therethrough, the forces created as a result of thermal expansion have been strong enough to cause some of these supports to rip out thereby forcing the remainder of the supports to carry the entire weight of the busway system which they may or may not be able to do, but which in any event constitutes an unsafe condition.

OBJECTS OF THE INVENTION

It is therefore an object of the present invention to provide an electric power busway having means for accommodating thermal expansion wherein the busway with such means remains simple in construction, easy to manufacture, and low in cost.

A further object of the present invention is to provide an electric power busway having means for accommodating thermal expansion wherein the thermal expansion accomodating means may readily be incorporated in the busway without requiring any substantial modifications therein.

A still further object of the present invention is to provide an electric power busway having means for accommodating thermal expansion wherein the thermal expansion accommodating means may be utilized in waterproof versions of busway without inhibiting the effectiveness thereof.

Yet another object of the present invention is to provide an electric power busway having means for accommodating thermal expansion wherein the thermal expansion accommodating means may be utilized with equal effectiveness irrespective of whether the busway is mounted in a horizontal or a vertical position.

SUMMARY OF THE INVENTION

In accordance with the present invention there is provided an electric power busway apparatus including first and second elongated busway sections, each of which comprises an elongated generally rectangular cross-section housing and a plurality of elongated parallel busbar conductors supported in insulated relation therein. The busway sections are disposed in end-to-end aligned relation with their housings slightly spaced relative to each other, and with the end portions of the corresponding busbar conductors of the busway sections positioned in substantially side-by-side relation. With the respective busway sections so aligned, at least one surface of one of the sections is co-planar with a corresponding surface of the other of the sections. Generally planar top and bottom joint cover members span the space between the busway section housings and thereby serve to enclose the otherwise exposed end portions of the busbar conductors. Means are provided in the joint cover members and the co-planar surfaces of the housings for the purpose of ensuring that the latter are properly positioned relative to each other prior to their being removably connected by fastening means. The positioning means and the fastening means are each provided with means whereby the busway sections while still interconnected can move relative to each other as required due to the thermal expansion thereof which occurs under normal operating conditions.

The invention will be more fully understood from the following detailed description and its scope will be pointed out in the appended claims.

BRIEF DESCRIPTION OF THE DRAWINGS

FIGURE 1 is a perspective view of a joint between two busway sections incorporating the present invention;

FIGURE 2 is a plan view, with the housing top and bottom covers removed, of the joint of FIGURE 1;

FIGURE 5 is a fragmentary sectional view similar to

FIGURE 4 illustrating the housing top cover in its tightened condition; and

DESCRIPTION OF A PREFERRED EMBODIMENT

Figure 3:
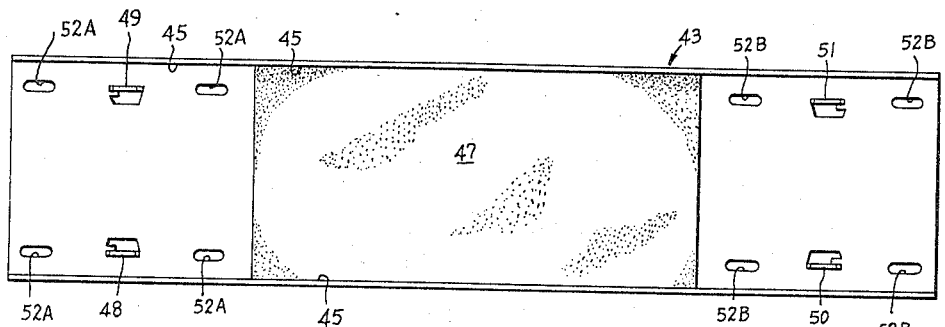
FIGURE 3 is a plan view of the housing top cover shown in FIGURE 1 constructed in accordance with the present invention.

Referring now to FIGURE 1, the invention is shown as incorporated in an electric power busway apparatus comprising a joint construction interconnecting a pair of busway sections 10 and 11 respectively. The busway section 10 includes a pair of generally channel-shaped top and bottom members 12 and 13 respectively interconnected by a pair of generally channel-shaped side members 14 and 15 respectively. A plurality, in this case four, of insulated busbars 16A, 16B, 16C, and 16N, are supported by suitable insulating means, not shown, within the housing defined by the top and bottom members 12 and 13 and side members 14 and 15. Similarly, the busway section 11 comprises top and bottom members 17 and 18 interconnected by side members 19 and 20, and containing busbars 21A, 21B, 21C, and 21N respectively.

As best seen with reference to FIGURE 2, the top and bottom members 12, 13, and 17, 18 of the respective sections 10 and 11 are discontinued short of the joint location. The side members 14 and 15 of the section 10 are, however, extended slightly by extensions 23 and 24 respectively, attached to the housing side members by suitable means such as by welding, bolts and nuts, or rivets 25, 26, respectively. Likewise the side members 19 and 20 of the section 11 are extended by relatively longer extensions 27, 28, attached to the side members 19 and 20 by suitable means such as by rivets 29, 30. The side extensions 27 and 28 extend beyond the joining portion of the joint and terminate in outwardly directed end portions 27A, 28A for a purpose to be described.

A strip of resilient gasketing material 31, 32 is attached to each of the side extensions 23 and 24. When the housing sections are brought together in the assembled condition as indicated in FIGURE 2, the outwardly flared portions 27A, 28A of the side extensions 27 and 28 overlap the side extensions 23 and 24, and engage the gasket strips 31, 32 respectively, so that when the joint is clamped together these surfaces provide a tight seal for the side members.

The ends of the busbars 16A, 16B, 16C, and 16N are outwardly offset, and the ends of the busbars 21A, 21B, 21C, and 21N of the section 11 are also outwardly offset so as to overlap as shown in FIGURE 2 when the busway sections are brought together. The overlapped busbar ends are insulated from each other by generally rectangular platelike rigid insulators 33, 34, 35, 36 and 37, each attached to one of the busbars 21A, 21B, 16C, 21C, and 21N, respectively. The busbar ends 21A, 21B, 21C, and 21N are provided with holes (not shown), and the busbar ends 16A, 16B, 16C, and 16N are provided with slots (not shown), for the purpose of receiving a clamping bolt 38 which passes through the complete assembly comprising the side member extensions 27, 28, insulators 33, 34, 35, 36, and 37, and overlapped busbar ends, to clamp the busbars together in the manner more particularly shown and described in my co-pending patent application, Ser. No. 570,597, filed Aug. 5, 1966, now Patent 3,365,537, and assigned to the same assignee as the present invention. It will thus be apparent that pressure by the bolt 38 on the side member extensions 27, 28 urging them inwardly toward each other will compress the flange portions 27A, 28A of the extensions 27, 28 against the gasket strips 31, 32 of the extensions 23, 24 to thereby provide the tight seal previously referred to.

For the purpose of cooperating with the joint cover members to be described, the top and bottom members 12 and 13 respectively of busway section 10 are each provided with elongated apertures or slots 39 and 40 (only those in top member 12 being shown in the drawings). Likewise, the housing top and bottom members 17 and 18 respectively of the section 11 are provided with elongated apertures or slots 41 and 42 (only those in top member 17 being shown in the drawings).

The housings of the busway sections 10 and 11 are adapted to be interconnected by means of the joint cover members 43 and 44 shown in FIGURE 1. Inasmuch as the joint cover members 43 and 44 are identical, the description thereof will be limited to joint cover member 43 as best seen with reference to FIGURE 3. The joint cover member 43 is of a generally planar sheet metal construction having downwardly turned flange portions 45 at opposite edges thereof, and a raised central portion 46 in which is provided a gasket 47 of resilient material for a purpose to be more fully described hereinafter. The cover member 43 includes at one end thereof a pair of tabs 48 and 49 corresponding substantially in length to the slots 39 and 40 respectively. The cover member 43 likewise is provided at the opposite end with a pair of tabs 50 and 51 corresponding substantially in size and location to the slots 41 and 42. In addition, the cover member 43 is provided with eight elongated bolt receiving holes 52A and 52B, the holes being elongated for a purpose to be more fully described hereinafter, corresponding in position to holes 53A and 53B provided in the top members 12 and 17 of the busway sections 10 and 11 respectively.

Figure 4:
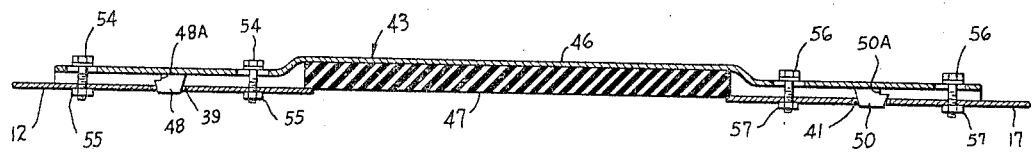
FIGURE 4 is a fragmentary sectional view of the busway sections and housing top cover of FIGURE 1 illustrated in an intermediate stage of assembly.
Figure 5:
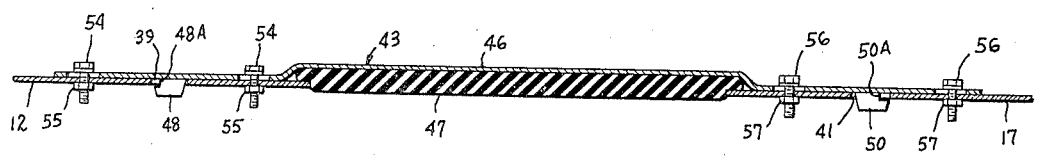

In order to interconnect the joint cover members 43 and 44 to the busway sections 10 and 11, the busway housings are first brought into substantially end-to-end aligned abutting relation with the corresponding busbars of sections 10 and 11 positioned in side-by-side relation as best seen in FIGURE 2. The joint cover member 43 is then attached in a preliminary manner by inserting bolts 54 through holes 52A in the cover member 43 and into holes 53A in the top member 12 of the busway section 10 and threading them into suitable retaining means such as the nuts 55 welded to the inner surface of the top member 12 of the section 10. The tabs 48 and 49 are inserted into the corresponding slots 39 and 40 of top member 12. Busway section 11 is then moved relative to the busway section 10 until the tabs 50 and 51 are aligned with corresponding slots 41 and 42 in the top member, into which they may then be inserted. Next the bolts 56 are inserted into the holes 52B in the cover member 43 and into holes 53B in the top member 17 of section 11, and are threaded into the nuts 57 welded to the inner surface of the top member 17 of section 11. Due to the inherent resiliency of the gasket 47, joint cover member 43 remains slightly biased away from the top members 12 and 17 as best seen in FIGURE 4. It will be noted that in this intermediate stage of assemby the tabs 48, 49, and 50, 51 substantially fill the slots 39, 40 and 41, 42 respectively thereby ensuring that when the tabs are in the corresponding slots the respective holes and slots of the busbar end portions of the busway sections are properly aligned for receiving the bolt 38. When this is done, the clamping bolt 38 is tightened to electrically interconnect the busbar ends 16A–16N and 21A–21N. Thereafter, the bolts 54 and 56 are tightened to compress the gasket 47 thereby allowing the surface of the joint cover member 43 to bottom against the outer surface of the top members 12 and 17 as seen in FIGURE 5. The joint cover member 44 is similarly interconnected to the bottom members 13 and 18 of the busway sections 10 and 11, respectively.

Referring now to FIGURE 3, in accordance with applicant's novel joint construction, the tabs 48, 49, 50, and 51 are each provided with an outwardly directed notched portion 48A, 49A, 50A, and 51A respectively. The purpose of these notches is to permit the top and bottom members 12, 13, and 17, 18 of the busway sections 10 and 11 respectively to move longitudinally as the metallic housings thermally expand as a result of the heat being generated inside the housing by virtue of the passage of electrical current through the busbars enclosed therein.

The bolt receiving holes 52A and 52B are elongated for the same reason, that is, to permit the housing top and bottom members to move relative to the bolts 54 and 56 which are threaded into the weld nuts 55 and 57, respectively. Although the busbar ends 16A–16N and 21A–21N are secured in side-by-side relation by means of the clamping bolt 38 tightly enough to provide a good electrical interconnection therebetween, the forces created as a result of the thermal expansion of the busbars are nevertheless strong enough to cause the busbar ends to slide longitudinally relative to each other. Thus, the notches in the tabs and the elongation of the bolt receiving holes in the top and bottom members of the respective busway sections permit longitudinal movement of the busway section housings and the busbars as required by virtue of the thermal expansion thereof.

Inasmuch as this movement resulting from thermal expansion is provided for at each joint in the busway run, the joints generally beeing spaced approximately 10 feet apart, there is no necessity for utilizing one or more costly expansion joints in the busway run. The embodiment illustrated in FIGURES 3, 4, and 5 wherein the tabs have outwardly directed notched portions is particularly applicable for use in those installations wherein both ends of the busway run are fixedly mounted since it allows all the movement resulting from thermal expansion to take place between the fixed ends of the busway run.

Figure 6:
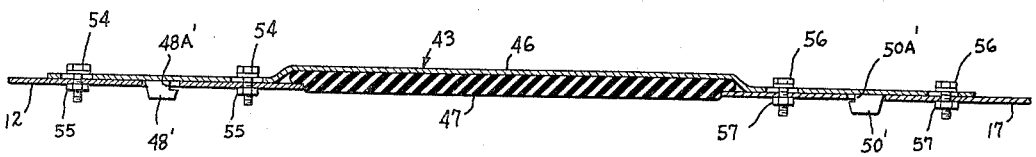
FIGURE 6 is a fragmentary sectional view of a modified form of the housing top cover illustrated in FIGURE 3.

For some installations however and particularly those in which only one end of the busway run is fixed, it is possible to utilize a joint cover member whose tabs are notched in the manner illustrated in FIGURE 6. Thus as seen therein with reference to tabs 48′ and 50′, the notched portions 48A′ and 50A′ thereof are located on the side of the tabs nearest the joint centerline. By notching the tabs in this manner, the metallic housings will move longitudinally in only one direction. Thus by knowing which end of the busway run is free to move, the tabs may be provided with notches located on whichever side thereof will permit the desired movement. For example, with the tabs notched as in FIGURE 6, the busway housings are free to move to the right. This is in contrast of course to the embodiment of the invention depicted in FIGURES 3, 4, and 5 wherein the metallic housings in moving toward the centerline of the joint move toward each other. Normally, with the tabs notched as in FIGURE 6, it is also desirable to prevent the busbar ends from moving at the joint to any significant degree relative to each other in order to ensure that the metallic housings will move in the prescribed manner. This can be accomplished by increasing the amount of torque applied to the clamping bolt 38 whereby the clamping force causes frictional forces between the busbar ends which exceed the restraining forces imposed on the busway system by mounting hangers, end conditions, etc., or in the case of vertical installations, the weight of the bus itself.

Applicant has thus in accordance with his invention provided an electric power busway joint which includes thermal expansion accommodating means which allows the metallic housings of the busway run and the busbars enclosed therein to thermally expand as required without requiring the use of costly prior art forms of expansion joints. Although the invention has been illustrated as being embodied in a busway constructed in a specific manner and with a particular number of busbars, it will of course be appreciated that the invention could equally well be utilized with other types of busway having more or less busbars. For example, the invention may be employed with waterproof versions of busway similar in construction to that illustrated herein wherein the busway sections themselves as well as the joints between sections are sealed against the entrance of moisture. This is possible because as seen in FIGURE 2 the bolt holes 53A, 53B and the tab receiving slots 39, 40, 41 and 42 are located adjacent the outer edges of the top and bottom members 12, 13, 17, and 18 and thus are outwardly of the side members 14, 15, 19 and 20 which enclose the busbars. Similarly the bolt holes and the tab receiving slots are sufficiently spaced from the busway joint so as not to interfere with the effectiveness of the waterproofing of the joint.

Further, if desired the respective lengths of the tabs may be altered such that for example the tabs 48 and 50 as well as their corresponding slots 39 and 41 would be of a shorter length than the tabs 49 and 51 and their corresponding slots 40 and 42. Because of this construction, if by chance the wrong ends of two housings are brought together, it will be found that the joint cover members cannot be made to engage the required slots corresponding to the desired tabs since in this case, there will be a short and a long slot on the same side of the assembly. This provides a polarizing means, and gives an indication of error to the installer, permitting its correction before any danger has been caused.

As another modification of the invention, if desired especially from the standpoint of cost and manufacturing considerations, the respective tabs of the joint cover could be notched on either side thereby enabling their common use in either the embodiment of the invention illustrated in FIGURES 3, 4, and 5 or the embodiment illustrated in FIGURE 6.

What I claim as new and desire to secure by Letters Patent of the United States is:

1. An electric power busway apparatus comprising:
   (a) first and second busway sections, each having an elongated generally rectangular cross-section housing and a plurality of elongated parallel busbar conductors supported in insulated relation therein;
   (b) said first and second busway sections being disposed in end-to-end aligned relation with their housings slightly spaced relative to each other and with the corresponding busbar conductors of said busway sections positioned in substantially side-by-side relation;
   (c) means clamping corresponding ones of said busbar conductors together to provide a good electrical interconnection therebetween;
   (d) said housings of said first and second busway sections having corresponding surfaces of at least first end portions thereof extending in co-planar relation;
   (e) generally planar top and bottom joint cover members overlapping said co-planar extending surfaces of said housings to thereby enclose the otherwise exposed end portions of said busbar conductors of said first and second busway sections;
   (f) positioning means comprising a plurality of tabs on said top and bottom joint cover members and a plurality of corresponding slots on said co-planar extending surfaces of said housings;
   (g) fastening means removably connecting said top and bottom joint cover members to said co-planar extending surfaces of said first and second busway section housings;
   (h) means on said top and bottom joint cover members for accommodating the thermal expansion of said busway section housings and said busbar conductors while said busway sections are interconnected by said joint cover members; and
   (i) said means for accommodating thermal expansion including notched portions on said plurality of tabs, said notched portions permitting said busway sections to move toward the centerline of the busway joint existing therebetween.

2. An electric power busway apparatus comprising:
   (a) first and second busway sections, each having an elongated generally rectangular cross-section housing and a plurality of elongated parallel busbar conductors supported in insulated relation therein;
   (b) said first and second busway sections being disposed in end-to-end aligned relation with their housings slightly spaced relative to each other and with the corresponding busbar conductors of said busway sections positioned in substantially side-by-side relation;

(c) means clamping corresponding ones of said busbar conductors together to provide a good electrical interconnection therebetween;

(d) said housings of said first and second busway sections having corresponding surfaces of at least first end portions thereof extending in co-planar relation;

(e) generally planar top and bottom joint cover members overlapping said co-planar extending surfaces of said housings to thereby enclose the otherwise exposed end portions of said busbar conductors of said first and second busway sections;

(f) positioning means comprising a plurality of tabs and a plurality of corresponding slots on said top and bottom joint cover members and said co-planar extending surfaces of said housings;

(g) each of said top and bottom joint cover members including a first set of bolt receiving holes;

(h) each of said co-planar extending surfaces of said housings including a second set of bolt receiving holes aligned with said first set of bolt receiving holes;

(i) fastening means removably connecting said top and bottom joint cover members to said co-planar extending surfaces of said first and second busway section housings, said fastening means comprising a plurality of bolts positioned in said first and second sets of bolt receiving holes; and (j) means on said top and bottom joint cover members for accommodating the thermal expansion of said busway section housings and said busbar conductors while said busway sections are interconnected by said joint cover members, said means for accommodating thermal expansion comprising a notched portion on each of said tabs and elongated portions in each of one of said first and second sets of bolt receiving holes.

References Cited

UNITED STATES PATENTS

| | | | |
|---|---|---|---|
| 2,706,744 | 4/1955 | Rudd | 174—99 |
| 3,377,421 | 4/1968 | Ericson | 174—99 XR |

DARRELL L. CLAY, Primary Examiner

U.S. Cl. X.R.

174—68